United States Patent [19]

Newsome et al.

[11] Patent Number: 4,615,922

[45] Date of Patent: Oct. 7, 1986

[54] ORIENTED POLYMERIC FILM

[75] Inventors: David L. Newsome, Neenah; Arnold R. Rein, Menasha, both of Wis.

[73] Assignee: American Can Company, Greenwich, Conn.

[21] Appl. No.: 701,861

[22] Filed: Feb. 14, 1985

Related U.S. Application Data

[62] Division of Ser. No. 542,031, Oct. 14, 1983, Pat. No. 4,557,780.

[51] Int. Cl.$^4$ .............. B65D 85/00; C08G 41/04
[52] U.S. Cl. .................. 428/35; 428/475.5; 428/475.8; 428/476.1
[58] Field of Search .............. 428/35, 475.5, 475.8, 428/476.1

[56] References Cited

U.S. PATENT DOCUMENTS

| | | | |
|---|---|---|---|
| 4,082,854 | 4/1978 | Yamada et al. | 426/106 |
| 4,254,169 | 3/1981 | Schroeder | 428/35 |
| 4,347,332 | 8/1982 | Odorzynski et al. | 524/169 |
| 4,425,410 | 1/1984 | Farrell et al. | 428/516 |
| 4,427,825 | 1/1984 | Degrassi et al. | 525/56 |
| 4,456,646 | 6/1984 | Nishimoto et al. | 428/216 |
| 4,457,960 | 7/1984 | Newsome | 428/35 |
| 4,468,427 | 8/1984 | Degrassi et al. | 428/220 |
| 4,501,798 | 2/1985 | Koschak et al. | 428/349 |

FOREIGN PATENT DOCUMENTS 0087080  8/1983  European Pat. Off. .

Primary Examiner—John E. Kittle
Attorney, Agent, or Firm—Stuart S. Bowie; Thomas D. Wilhelm

[57] ABSTRACT

Molecularly oriented plastic films have five molecularly oriented layers. A first layer provides a barrier to gaseous transmission through the film and has a composition of 0% to 50% nylon or nylon copolymer, and conversely 50% to 100% ethylene vinyl alcohol. Second and third adhesive layers are adhered to the surfaces of the first layer, and have compositions comprising olefinic polymers, or copolymers, or blends thereof, the compositions having carboxyl modifications therein. Fourth and fifth layers are adhered to the second and third layers on the respective surfaces opposite the first layer. The fourth and fifth layers comprise 40% to 100% ethylene vinyl acetate and 0% to 60% linear low density polyethylene. Also disclosed are processes for making the oriented five layer films.

14 Claims, 3 Drawing Figures

ORIENTED POLYMERIC FILM

This is a division of application Ser. No. 542,031, filed Oct. 14, 1983, now U.S. Pat. No. 4,557,980.

BACKGROUND OF THE INVENTION

It is highly conventional to utilize films of various oriented polymeric materials for the packaging of foods and like products. Although the necessary and desirable properties depend upon the specific applications for which the films are intended, normally they should exhibit good uniformity, strength, toughness, abrasion and flex-crack resistance, gloss, and heat stability. When formed into closed and sealed packages, such as by heat sealing, the packages should exhibit high burst strength and resistance to cutting, such as by metal closure clips. Also, because of the susceptibility of many food products to deterioration upon exposure to oxygen, it is often imperative that the film employed exhibit good barrier properties.

As is also well known, it is common practice to package meat and other food products in molecularly oriented films that can be shrunk upon exposure to heat. The need for good strength characteristics is particularly acute in such instances because of the vulnerability of the film to damage under the conditions of use.

Generally, the combination of characteristics necessary to provide films that are suited for use in many packaging applications is not afforded in a single layer product, and numerous multiple layer films have been developed or proposed.

Both the film producer and the film user require that oriented films satisfy a multiplicity of requirements. Of primary importance to the film user, in the case of shrink films, is the capability of the film to survive physically intact the processes associated with the film as a package, as it is filled, evacuated, sealed closed and heat shrunk. The film package must also be strong enough to survive the material handling involved in moving the contained product, which may weigh 100 pounds or more, along the distribution system to the next processor or to the user. Thus the package must physically protect the product.

It is often desirable to the film user that the package film serve as a barrier to infusion of gaseous materials from the surrounding environment. Of particular importance is provision of an effective barrier to infusion of oxygen, since oxygen is well known to cause spoilage of food products. The package should also be clear for product appeal purposes.

The film producer requires a film which can be produced competitively while meeting the performance requirements of the user. Thus the film materials should be readily extrudable, and susceptible to orientation, with sufficient leeway in process parameters as to allow for efficient film production. The process should also be susceptible to efficient extended production operations. In the orientation process, the film must be able to withstand the stretching. The orientation temperature should be a temperature which is economically achieved by the producer, and which provides for use of economical shrink processes by the film user.

Conventionally used shrink films are often produced and used as bags and have generally been constructed with ethylene vinyl acetate (EVA) and an oxygen barrier layer such as saran or ethylene vinyl alcohol (EVOH).

Notwithstanding the advantages, shrink film packaging, and particularly shrink bag packaging of meat, is not without its difficulties, many of which are attributable to limitations inherent in the films utilized for such applications. As will be appreciated, the processes of stretching the film, and later shrinking it, subject the film to rather severe conditions, due to the nature of the operations.

It is especially important to appreciate that the film is particularly vulnerable to failure at conditions of operation due to the relatively high temperatures to which it is subjected in the orientation and shrinking processes.

The film must be susceptible to orientation without distortion, or separation of the multiple layers which are normally present in films of this nature. The film must be strong enough, at the orientation temperature to withstand the the stretching without the creation of holes, tears, or nonuniform zones of stretching. In the case of blown tubular film, as in the well-known double bubble process, the film must be capable of physically supporting the stretching bubble during the orientation process. Finally, each of the layers of the film should be susceptible to orientation in the multiple layer film without fracture, separation, or creation of holes.

In shrink packaging use, the film must respond to heat rapidly enough for commercial practicality, and yet must not exhibit such a level of shrink energy as would cause the film to pull apart or delaminate during shrinkage, under its own internal forces. Moreover the shrink related problems may be seriously increased, for example, when a contained cut of meat includes protruding bones and/or significant depressions in its surface.

Prospective films are conveniently subjected to preliminary testing in a laboratory. In one such test, the prospective film is formed into packages by means of heat seals and air is injected into the packages. The recorded parameter is the air pressure that a given package successfully holds without failure of the sidewalls or the seals. Another convenient laboratory test measures the interlayer adhesions at the layer interfaces, by pulling apart the layers and measuring the force required for the pulling. The ultimate goal, of course, is to produce a sealed package, containing the contemplated product; and to have the sealed package, containing the product, retain its integrity as a sealed unit throughout the distribution and sale of the product, to the time of opening by the product user.

In the uses contemplated for oriented films of the invention, the most severe environments normally encountered by the films are those associated with the overall process of a packager, where films may be made into containers, containers are filled with product and are sealed closed, and may also be evacuated and/or heat shrunk. Thus the most significant test is to use the films in the commercial processing operations of a packager, to ascertain the overall reduction in the percentage of packages which leak.

Certain of the available 3-layer films having a saran layer are disclosed in Widiger et al U.S. Pat. No. 4,247,584. Those films provide a good balance of properties. Saran, however, has a number of its own problems. It has a brown color, which is generally undesirable. During extended extruder operation, bits of carbon form from decomposition of the saran in the extruder equipment, and later pass out through the die as undesired inclusions in the film. As a result, the operation must be shut down periodically for die cleaning. Finally, the power required to extrude saran is relatively high. Thus, while saran is accepted as a functional material, alternate barrier material choices are desirable.

It is also suggested in the foregoing Widiger et al patent that a barrier layer of EVOH be used instead of the saran layer, so as to provide the excellent oxygen barrier properties of EVOH while avoiding the disadvantages of saran. And while EVOH does have certain problems associated with its fabrication and use, in certain applications it may be advantageously used.

In further improvement of the technology of oxygen barrier materials, oriented blends of EVOH are disclosed in copending application Ser. No. 290,171 by Schroeder et al, filed Aug. 5, 1981 and in copending application Ser. No. 290,172 by Newsome, also filed Aug. 5, 1981, both of common assignment herewith. The Schroeder et al application discloses oriented films of blends of EVOH and nylon along with plasticizers for the nylon. Newsome '172 discloses oriented films wherein EVOH is blended with any member of a family of polymers.

In another related U.S. Pat. No. 4,457,960 by Newsome, and of common assignment herewith it is proposed that the inclusion of linear low density polyethylene (LLDPE) in at least one of the layers provides a significant decrease in the leaker rate when the film bags are used for shrink packaging of meat.

While the art of oriented multiple layer films is becoming crowded, there still exists a deficiency, as a need for easily produced oriented films which exhibit the afore-mentioned desirable properties. Particularly, there remain certain problems having to do with strength of the film and packages made therefrom and adhesion of the layers to each other at the layer interfaces, in addition to the typical problems with incompatibility of certain polymers with orientation. Thus it is desired to provide a film having improved strength properties imparted generally by creating a film having the desirable characteristics and imparting thereto properties of improved interfacial adhesion, and attendant improvements in the overall strength properties of such films as demonstrated in laboratory tests and in commercial use.

SUMMARY OF THE INVENTION

It has now been found that certain improvements are achieved in an oriented film comprising five polymeric layers wherein a first layer provides a barrier to gaseous transmission through the film and has a composition of greater than 0% and no more than 50% nylon or nylon copolymer, and conversely 50% to less than 100% of an ethylene vinyl alcohol copolymer. The first layer has two opposing surfaces. Second and third adhesive layers are adhered to the surfaces of the first layer. The second and third layers both have compositions comprising olefinic polymers, or copolymers, or blends thereof, the compositions having carboxyl modifications therein. Fourth and fifth layers are adhered to the second and third layers on the respective surfaces opposite the first layer, the fourth and fifth layers comprising 40% to 100% EVA and 0% to 60% LLDPE.

Each of the layers of the film is stretched in molecular orientation to substantially the same degree; and the layers are adhered to each other directly at the recited surface interfaces without the use of additional adhesive materials.

The oriented film is susceptible to being made into a closed and sealed container by means of heat seals formed about the periphery of adjacent superimposed sheets. The resulting container and its seals are capable of withstanding a high static internal gaseous pressure, up to at least as high as 29 pounds per square inch gauge (psi).

In some of the preferred structures the composition of the first layer is 30% to 50% nylon and 70% to 50% EVOH. An especially preferred composition for some structures is 40% nylon and 60% EVOH. A small residuum of EVA is also present as unused reaction component from the hydrolysis of EVA to EVOH.

The invention also includes a method of making five layer oriented films. In that method the film is first formed by being coextruded as a five layer structure and is subsequently oriented as a five layer structure. The coextrusion may be performed through a narrow straight slot die to form a flat sheet such as by cast coextrusion. Another means of forming the film is by coextruding it through a circular die to form a tube as by tubular extrusion, blown film extrusion, or water quenched tubular extrusion.

Where the film is formed as a flat sheet, orientation may be achieved as by compression rolling, by stretch orientation between a pair of nip rolls or by a tentering orientation process. Where the film is produced in tubular form, its orientation is preferably effected by forming a bubble between two pairs of nip rolls and controlling the amount of orientation according to the amount of gas trapped in the bubble and by driving the nip rolls at different speeds as desired, to create longitudinal stretching of the film as well as the transverse stretching incurred primarily by means of the gas entrapped in the bubble. The entire method of producing the film includes coextruding a five layer film, cooling the coextruded film, reheating the film to orientation temperature, molecularly orienting the film, and cooling the oriented five layer film.

Particularly where the film is to be produced using tubular processes and where the tube is to be inflated or oriented in tubular form, it is desirable that the fourth and fifth layers include at least 10%, and preferably 25% to 40% LLDPE as a blend material with EVA.

The selection of the specific compositions of the adhesive materials for the second and third layers depends to some extent on the compositions of the first, fourth and fifth layers, and on the processing conditions, including the coextrusion and orientation processes. It is necessary that the second and third layer compositions include carboxyl modifications. Exemplary of these modifications are organic acids and anhydrides. Preferred materials are olefinic, of which specific examples are low density polyethylene (LDPE), medium density polyethylene (MDPE), EVA, and LLDPE, all having the recited carboxyl modifications. Blends of modified olefins may also be advantageously used.

The invention is further embodied in a closed and sealed bag. The fabrication of the bag from the film is most easily accomplished when the film is extruded and oriented as a continuous tube. The bag is formed by severing a length of the tubular film, across its transverse dimension, from the continuous tube. The severed portion is essentially a collapsed cylinder with both ends open. The fabrication of a bag is completed by forming a heat seal across one end of the collapsed cylinder. The other end is left open for loading of product. When the product has been loaded, the bag is then evacuated, a clip is put in place on the unsealed end, and the bag is heat shrunk. Alternately the final closing seal may be made by, for example, a separate heat sealing process.

DETAILED DESCRIPTION OF THE PREFERRED EMBODIMENTS

Figure 1:
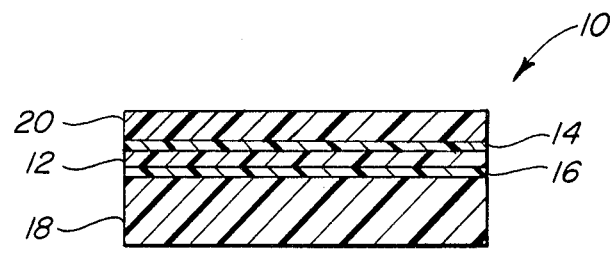
FIG. 1 is a cross-section of a sheet material of the invention.
Figure 2:
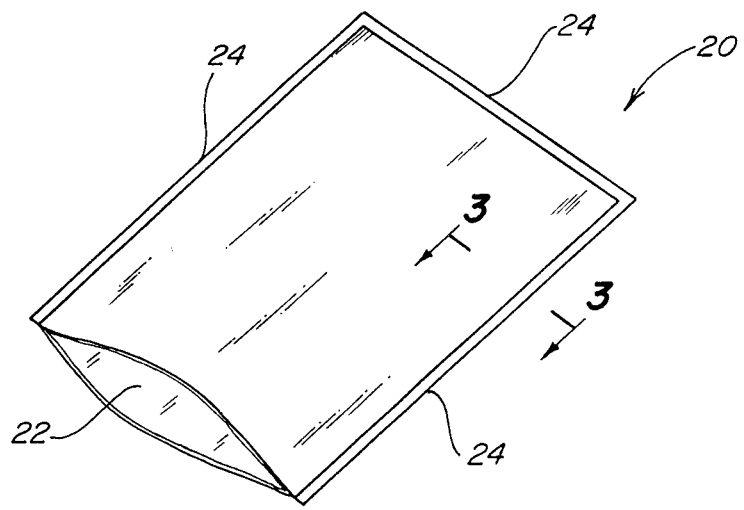
FIG. 2 is a pictorial view of a bag made from sheet material of the invention.
Figure 3:
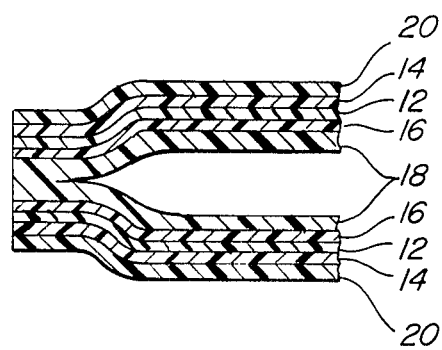
FIG. 3 is a cross-section of a portion of the bag of FIG. 2, taken at 3—3 of FIG. 2.

Each of the five polymeric layers in the films of this invention must satisfy certain specific functional requirements as described hereinafter. The first layer 12 is generally known as the core layer and has two layers 14 and 16 on each of its surfaces, such that, in traversing through the thickness of the film from either outside surface of the film, two other layers are traversed before the first layer 12 is encountered. The composition of the first layer 12 is selected to provide functional packaging properties, in the film, that impede oxygen transmission, and to lend toughness to the layer, particularly in the plastic state, to facilitate handling of the film during film production. It will be appreciated that desirably the composition of each layer imparts some degree of toughness to the film for ease of film production. The thicknesses of the first, fourth and fifth layers, however, cause them to be the layers most susceptible to improvements in toughness by proper selection of polymer composition, so usually these are the layers for which such improvements are sought.

THE FIRST LAYER

Returning to the discussion of the first layer 12, there is included therein at least 50%, and preferrably at least 60% of an EVOH. The fractional amount of EVOH in the first layer 12 determines to a significant degree the overall effectiveness of the film in impeding transmission of oxygen. While as little as 20% EVOH in the first layer composition does improve the oxygen transmission rate over a nylon composition without EVOH, it is usually desirable to have at least 50% EVOH in the composition to impart the desired superior oxygen barrier property generally associated with EVOH. Therefore, 50% EVOH represents a preferred lower limit to the amount of EVOH. Higher levels of EVOH are advantageously utilized. While up to nearly 100% EVOH is acceptable for the purposes of the invention, little added benefit of oxygen transmission barrier is achieved at levels of over 70% EVOH, and 60% EVOH is generally believed to provide the most efficient usage. The EVOH typically has a molecular weight in the range of about 20,000 to 30,000 and a melting point temperature of about 325° to 375° Fahrenheit, these characteristics corresponding roughly to melt indices of about 9 to 1.5. The melt index values herein are determined in accordance with ASTM Test D-1238, Procedure E or L, using a weight of 2160 grams and temperature of either 190° or 210° Centigrade, as appropriate. Typically, the EVOH has a density of 1.1 to 1.2. Suitable temperature for processing the EVOH is about 400° to 480°, and preferrably 410° to 440° Fahrenheit. While the degradation temperature of EVOH is generally regarded to be about 450°, this is not inconsistent with the higher processing temperatures herein, due to the short residence time in the extrusion process. Illustrative of EVOH resins that are suitable for use are those available from Kuraray and from Nippon Gohsei, both of Japan. The products of the former company are EP-E and EP-F, and those of the latter company are designated SOARNOL-D, SOARNOL-E, and SOARNOL-ET. EP-E and EP-F contain about 55% and 68% vinyl alcohol, respectively, in the molecule and have melt flow index values, as determined at 190° Centigrade, of 5.8 and 1.5 respectively. SOARNOL-D, SOARNOL-E, and SOARNOL-ET contain 71%, 62% and 62% vinyl alcohol, respectively, and exhibit melt flow index values of 7.4, 8.0 and 3.5, respectively, as determined at 210° Centigrade.

After accounting for the presence of the EVOH, the balance of the composition of the first layer 12 is a plasticized nylon. The inclusion of nylon generally imparts the property of toughness, while reducing the amount of the more expensive EVOH which is used. Structural properties of improved toughness of the first layer composition as compared to 100% EVOH are discernible with as little as 10 weight percent nylon, based on the total layer composition. However, it should be appreciated that the incorporation of nylon in virtually any concentration is generally of some benefit, in improving orientation processing as well as enabling cost reductions to be realized.

A surprising feature of the films of the invention resides in the fact that as much as 30 weight percent nylon can be included in the blend composition of the first layer without reducing the effective oxygen barrier properties of the EVOH resin significantly. This has been found to hold generally true regardless of the nature of the nylon used, or of any additives which may be incorporated into the nylon.

While the polycondensation resins such as nylon 66 may be employed to advantage, for most purposes the addition polymer nylon 6 is preferred. To be suitable for such use, the nylon generally has a molecular weight in the range of 20,000 to 30,000 and a melting point temperature of about 415° to 440° Fahrenheit, with a melting point temperature of about 428° being optimal in many cases. Such nylon resins are normally processed at temperatures of about 510° to 540°, thus presenting a fundamental difficulty which is addressed in U.S. Pat. No. 4,347,332, issued Aug. 31, 1982, to Odorzynski and Knott. As taught therein, the provision of a nylon-/EVOH blend which can be extruded at temperatures below the degradation temperature of EVOH is achieved by the incorporation into the composition of an agent that serves as an effective plasticizer for the film-forming nylon. While some of the agents utilized may not previously have been regarded as plasticizers, in the the present blends of the first layer herein, they do appear to perform that function. It appears that the plasticizing agents are capable of intermolecular hydrogen bonding and disruption of crystallinity within the blend structure, to effectively lower the temperature at which processing can be carried out. As a result, film-forming nylons that normally process at temperatures of about 510° to 540° Fahrenheit become processable in these blend compositions at temperatures that are considerably lower and that are, in fact, within a range of temperatures at which the EVOH is also processable and not subject to significant degradation. More particularly, the externally plasticized film-forming blend compositions of nylon resins and EVOH resins, so plasticized, are processable at temperatures of about 400° to 480° Fahrenheit, with preferred temperatures being about 410° to 440°.

The amount of plasticizer used may vary between fairly wide limits, and as little as 2 percent or as much as 25 percent, based upon the weight of the nylon resin, may be acceptable. For satisfactory results, it is usually necessary to use a concentration of plasticizer in excess of 2 percent, and 5 weight percent usually represents a preferred lower limit for such blends. Amounts of plasticizer in excess of 15 weight percent normally produce little added benefit, insofar as processing is concerned and therefore that concentration represents a preferred upper limit. The amount of plasticizer utilized in any given case, of course, depends upon a number of factors, including the composition of the nylon film-forming resin and of the specific plasticizer employed, the actual processing temperatures involved, and the like.

Specific plasticizers preferred fall into three main categories, namely the long chain fatty acid amides, (i.e. those containing 16 to 18 carbon atoms in the chain), the aromatic sulfonamides, and the nylons and nylon copolymers which exhibit a melting point temperature of less than about 400° Fahrenheit. Within these categories, the most desirable plasticizers are lauramide, o,p-toluenesulfonamide, N-ethyl-o,p-toluenesulfonamide (the two sulfonamides of course being mixtures of the ortho and para isomers), and nylons such as nylon 6/36, nylon 11 and nylon 12 having molecular weights of about 7,000 to 10,000. Other suitable products that can be used as plasticizing agents include nylon 11 and nylon 12 of about 25,000 molecular weight and melting at temperatures of about 370° and 350° Fahrenheit, respectively, 2,2,4-trimethyl-1,3-pentane-diol, cumyl-phenyl-benzoate, and a product offered commercially by Paul and Stein Brothers of New York, N.Y. under the designation STYSOLAK AW, referred to as a polyethylene oxide.

The blends utilized to produce the first layer 12 of the oriented films of this invention may utilize what may be regarded as internally plasticized nylon rather than incorporating such a component as an independent third ingredient (i.e. in addition to a film-forming nylon and the EVOH copolymer). The internally plasticized nylons may be either random or block copolymers, or they may be alloys of a nylon resin with an alloying resin. In any event, it is believed that the comonomer or the alloying resin, as applicable disrupts the crystalline structure of the relatively high melting nylon constituent and/or undergoes hydrogen or other secondary bonding so as to produce the desired effect. As will be appreciated, the ultimate objective is to provide a nylon ingredient which is processable at approximately the temperature at which the EVOH can be processed. Nylon copolymers that are suitable for use without added plasticizers include nylon 6/12; 6/36; and 6/66; the primary factor being that the copolymer has a melting point temperature below about 400° Fahrenheit. For some applications a low melting nylon (e.g. nylon 11 or nylon 12) can be used, without modification or added plasticizer, in combination with the EVOH. It may alternately be blended in virtually any proportion with a higher melting nylon, such as nylon 6, to form the nylon component of the nylon/EVOH blend.

In producing the externally plasticized blends of the invention it will generally be desirable to premix the plasticizer with the film-forming nylon, so as to ensure maximum effectiveness in producing the desired result. This may be done in a compounding extruder or the like, depending to some extent on the physical state of the additive. It is generally most advantageous to produce pellets of such plasticized nylon, which can then be admixed with pellets of the EVOH prior to introduction into the extruder that is to be used for production of the first layer 12.

THE SECOND AND THIRD LAYERS

The second and third layers, 14 and 16 respectively of the film serve generally the function of providing adhesion between the first layer 12 and the fourth and fifth layers, 18 and 20 respectively. Dispositionally, the second and third layers are located between the first and fourth layers and the first and fifth layers, respectively. As is clear from the above description of the first layer, and as will be clear from the following description of the fourth and fifth layers, the compositions of the first, fourth, and fifth layers can vary somewhat independently of each other, within relatively broad ranges. Thus the examples which follow herein are considered illustrative, only, of the adhesive compositions and processes which are useful in making films of this invention. In general, the adhesives of this invention are basically olefinic polymers or copolymers having carboxylic modifications thereto. The preferred basic polymers are LDPE, LLDPE, MDPE and EVA. The preferred carboxylic modification is an organic acid or anhydride, and particularly maleic anhydride.

Specific adhesive polymers which have an LDPE as base polymer and which exemplify the desired compositions of the second and third layers, are Novatec AP220L available from Mitsubishi Chemical Industries Company, and PX-158-5, available from Chemplex Company. An LLDPE-based adhesive polymer is available from Mitsui Company, Japan, as Admer NF-500. Resins based on MDPE are Novatec AP212H and AP460H, for example. Resins based on EVA are Admer VF-500 from Mitsui Company, PX-3 and PX-100 from Chemplex Company, and CXA 3101 from DuPont Company. Another olefinic based resin containing vinyl acetate moieties is CXA E-136 from DuPont. In some cases it will be found advantageous to provide as an adhesive layer a blend of polymers. It may be a blend of more than one of the adhesive polymers; it may be a blend of, for example, the selected adhesive polymer with material such as is incorporated into the adjacent layers. Indeed, it may be a blend of a combination of adhesive polymers and material substantially the same as that in the fourth or fifth layers. Thus it is conceivable that the second or third layer, or both, could comprise fractional amounts of polymeric material either identical to or very similar to those materials used in the compositions of the adjacent layers—i.e. the first, fourth, and fifth layers, as applicable.

THE FOURTH AND FIFTH LAYERS

The fourth and fifth layers serve generally as the outer layers of the film. The compositions of the fourth and fifth layers are 40% to 100% EVA and 60% to 0% LLDPE. The fourth layer 18 is generally designed to have heat sealable properties for the purpose of making a sealed container by means of heat seals. The fifth layer 20 is disposed on the opposite surface of the film from the fourth layer 18, and in a formed container, serves as the outer layer of the container. In the formed container, the fifth layer 20 serves a primary function of protecting the package and its product from physical abuse.

The compositions of the fourth and fifth layers may or may not be the same so long as each composition is within the compositional parameters given herein. The EVA provides high levels of adhesion at the interfaces of the fourth and fifth layers with the second and third layers. EVA's, particularly those having greater than 85% ethylene, also provide substantial structural strength to the film during the orientation process, and are especially beneficial for the orientation of tubular films. The ability of EVA to provide processing strength for the film manufacture is most efficiently used where high levels of EVA are present in the fifth layer. The LLDPE is highly desired for its capability of surviving intact the processes involved in shrinking those films which are formed into sealed containers and shrunk by a heat shrinking process. In general, the ability of, for example, a shrink bag to withstand the shrinking process correlates directly with increasing percent LLDPE, up to about 50% to 60% LLDPE.

Referring, now to those of the inventive films herein which are useful as shrink films, the inclusion of LLDPE in at least one of the fourth and fifth layers is required, with at least 10% LLDPE in the layer being preferred. Films having 25% to 40% LLDPE in at least one of the fourth and fifth layers show marked shrink strength improvement over films without LLDPE. Films having higher percentages of LLDPE, such as 40% to 60% in at least one of the fourth and fifth layers, have even better shrink performance, but are increasingly more difficult to stabilize in the manufacturing process, the degree of difficulty increasing with increased percentages of LLDPE. Because of manufacturing processes, layer compositions having greater than 60% LLDPE are not preferred.

The overall thickness of films of this invention is nominally the same as the thickness of conventional oriented films used for shrink packaging. Films are generally about 2.25 mils thick, with a normal range of 1.5 to 3.0 mils. Films thinner than 1.5 mil tend to be too weak to perform all required functions. Films thicker than 3.0 mils are economically unable to compete with thinner, competitive films, though film thicknesses up to 8–10 mils will be functionally acceptable, and may be preferred where other speciallized packaging properties are required.

As regards preferred thicknesses of the individual layers for a 2.25 mil film, the first layer 12 is 0.15 to 0.30 mil thick. The second and third layers, 14 and 16, are both about 0.10 mil, just thick enough to provide a continuous layer. The fourth layer 18 is the thickest layer of the film and is 1.25 to 1.40 mil. The fifth layer 20 is about 0.50 mil.

LLDPE polymers suitable for use in the fourth and fifth layers are those having a melt index (MI) of up to about 6. Preferred LLDPE polymers have an MI of 0.5 to 1.5. Among the preferred polymers are DOW 2045, DOW XD-61508.01 and DuPont 11P. A modified LLDPE polymer, Admer NF-500, is also technically suitable, though its price usually prevents its use in the fourth and fifth layers.

EVA's preferred for use in the fourth and fifth layers are those having 6% to 12% vinyl acetate (VA) content and a melt index less than 1. While blend amounts are shown herein in weight percent, VA contents are mole percent. Especially preferred EVA's have VA content of 7% to 9% and melt index of 0.2 to 0.8.

While acceptable 3-layer subcombinations of the 5-layer films of the invention are difficult to make, as described hereinafter, the 5-layer films described herein surprisingly have been discovered to be susceptible to being manufactured according to conventional orientation processes. Thus there appears to be a special cooperation among the layers of the 5-layer films that is not present in 3-layer films and 3-layer subcombinations of the 5-layer films. In the following examples a few films are described in detail as being manufactured using equipment common to the "double bubble" process. Films of the invention may be made by this process, or other conventional processes. The process of making films or bags of this invention need not include exposing the film to ionizing radiation, for example in dosage amount of 3 megarads or more. Choice of the desired process depends not only on the film composition and structure but also on specific properties desired. In light of the disclosure herein, the choices on any particular film are now a matter of engineering selection.

Molecular orientation of the films of the invention may be effected utilizing any suitable technique, which depends somewhat on the structure of the film and the nature of the components of which it is comprised. It is believed that, in general, the most practical manner of extruding and orienting the film is by the so-called "double bubble" technique. As is well known, in such a method the film may be extruded downwardly as a tube formed by an annular die, and carried into a water quench tank, generally with a cascade of water on the outside surface of the tube to provide initial cooling. The tube is flattened in the quench tank, is withdrawn from the quench tank, and is reheated (normally in a second water bath) to its orientation temperature. It is then stretched in the machine direction between two sets of rolls that are so rotated as to establish a linear rate differential therebetween, and is simultaneously oriented in the cross-machine direction as an inflated bubble trapped between the nips of the rolls. In accordance with conventional practice, the film is usually cooled by air in the orientation zone.

In the orientation process, the film is typically stretched in both the machine direction and the cross machine direction. Convenient orientation ratios in both directions are 2/1 to 4/1. Preferred orientation temperatures are 206°–212° F. While the temperature is adjusted in accordance with the film composition, a most preferred orientation temperature for many of the films of the invention is 210° F.

EXAMPLE 1

A mixture for use as the composition of the fourth and fifth layers is made by dry blending a pellet mixture of 75% Norchem NPE-493 EVA, and 25% Dow XD-61508.01 LLDPE. The composition of the first layer is a blend of 60% SOARNOL-E EVOH and 40% Custom 615I nylon 6, made by dry blending pellets of the respective polymers. The second and third layers are Novatec AP220L. A first extruder is charged with the EVOH-nylon blend to form the first layer. Second and third extruders are charged with AP220L to form the second and third layers. Fourth and fifth extruders are charged with the blended EVA pellets of EVA and LLDPE to form the fourth and fifth layers. Using the five extruders, a five layer tube is downwardly coextruded. A water cascade cools the film initially as it exits the die. Cooling of the tube is completed in a water quench tank. The tube is then reheated to a temperature of 210° F., and is oriented as an inflated bubble at ratios of approximately 2.5/1 in the machine direction and 3.5/1 in the cross machine direction. The oriented film is cooled, the bubble collapsed, and the film wound up. In the resulting film the thicknesses are:
first layer—0.30 mil
second layer—0.10 mil
third layer—0.10 mil
fourth layer—1.25 mil
fifth layer—0.50 mil

EXAMPLE 2

An oriented five layer film is made as in EXAMPLE 1 except that the compositions of the second and third layers are Admer NF-500, LLDPE.

EXAMPLE 3

An oriented five layer film is made as in EXAMPLE 1 except that the compositions of the second and third layers are Admer VF-500, EVA.

EXAMPLE 4

An oriented five layer film is made as in EXAMPLE 1 except that the compositions of the second and third layers are Chemplex PX-3 EVA.

EXAMPLE 5

An oriented five layer film is made as in EXAMPLE 1 except that the compositions of the second and third layers are Chemplex PX-158-5 LDPE.

EXAMPLE 6

An oriented five layer film is made as in EXAMPLE 1 except that the compositions of the second and third layers are Chemplex PX-100 EVA.

EXAMPLE 7

An oriented five layer film is made as in EXAMPLE 1 except that the compositions of the second and third layers are DuPont CXA E-136 modified polyolefin.

EXAMPLE 8

An oriented five layer film is made as in EXAMPLE 1 except that the compositions of the second and third layers are DuPont CXA 3101 EVA.

EXAMPLE 9

An oriented five layer film is made as in EXAMPLE 1 except that the compositions of the first, fourth, and fifth layers are changed. The first layer is 60% SOARNOL-ET EVOH and 40% UBE 5033B nylon 6/66 copolymer. The fourth and fifth layers are 75% USI UE-80232 EVA and 25% DOW XD-61508.01 LLDPE.

EXAMPLE 10

An oriented five layer film is made as in EXAMPLE 9 except that the compositions of the second and third layers are DuPont CXA E-136.

EXAMPLE 11

An oriented five layer film is made as in EXAMPLE 9 except that the compositions of the second and third layers are Novatec AP212H, MDPE.

EXAMPLE 12

An oriented five layer film is made as in EXAMPLE 9 except that the compositions of the second and third layers are Novatec AP460H, MDPE.

EXAMPLE 13

An oriented five layer film is made as in EXAMPLE 1 except that the compositions of the second and third layers are Novatec AP212H, MDPE.

EXAMPLE 14

An oriented five layer film is made as in EXAMPLE 1 except that the compositions of the second and third layers are Novatec AP460H, MDPE.

EXAMPLE 15

An oriented five layer film is made as in EXAMPLE 9 except that the thickness of the fifth layer is increased to 8.25 mils so that the finished thickness of the film is 10 mils.

Table 1 shows data for each of the polymers used in the above examples.

TABLE 1

| Polymer | Base Resin | VA Content | Melt Index |
|---|---|---|---|
| USI UE 80232 | EVA | 9.0% | 0.40 |
| NORCHEM NPE 493 | EVA | 8.0% | 0.50 |
| DOW XD-61508-01 | LLDPE | NA | 1.20 |
| CUSTOM 615 I | NYLON 6 | NA | 3.19* |
| UBE 5033B | Nylon Copolymer | NA | — |
| NIPPON GOHSEI SOARNOL-E | EVOH | NA | 5.50 |
| NIPPON GOHSEI SOARNOL-ET | EVOH | NA | 2.70 |
| Adhesive Polymers | | | |
| ADMER VF 500 | vinyl acetate copolymer | — | 2.20 |
| DU PONT CXA 3101 | vinyl acetate copolymer | — | 3.50 |
| DU PONT CXA E-136 | Modified Polyolefin | yes | 2.50 |
| CHEMPLEX PX-3 | EVA | 9.0 | 3.00 |
| CHEMPLEX PX-100 | EVA | 12.0 | 0.85 |
| CHEMPLEX PX-158-5 | LDPE | NA | 1.80 |
| NOVATEC AP220L | LDPE | NA | 1.76 |
| NOVATEC AP212H | MDPE | NA | 0.70 |
| NOVATEC AP460H | MDPE | NA | 5.60 |
| ADMER NF 500 | LLDPE | NA | 2.00 |

*Solution viscosity.

Films made according to EXAMPLES 1–10 were tested for layer adhesion on an Instron Tensile Tester at a crossing head speed of 10 inches per minute. Test strips of film were cut six inches long by one inch wide with the length of the strips running in the machine direction of the film manufacturing process. Separation of the layers at their respective interfaces was initiated by one of two methods. In the first method, a piece of tape was adhered on each side of the film near the film edge and then the tapes were pulled apart. In the second method, the end of the sample strip was dipped into a solvent bath of 1,1,1, trichloroethane until the layers began to separate. The critical interlayer adhesions, those being the ones between the first and second layers, and between the second and fourth layers, are shown in Table 2 below. "Core" refers to the first layer. "Tie" refers to the second layer. "Inner" refers to the fourth layer.

TABLE 2

| Example | Tie Layer | Layer Adhesion Core/Tie (inner) | Tie/Inner |
|---|---|---|---|
| 1 | AP 220L | 553 | CNS |
| 2 | NF-500 | 785 | CNS |
| 3 | VF-500 | CNS | 46 |

TABLE 2-continued

| | | Layer Adhesion | |
|---|---|---|---|
| Example | Tie Layer | Core/Tie (inner) | Tie/Inner |
| 4 | PX-3 | 760 | CNS |
| 5 | PX-158-5 | CNS | 360 |
| 6 | PX-100 | 115 | CNS |
| 7 | CXA E-136 | CNS | CNS |
| 8 | CXA 3101 | 88 | CNS |
| 9 | AP 220L | CNS | CNS |
| 10 | CXA E-136 | 384 | 354 |

CNS = cannot separate.
All specimens tore on Instron.

In a study of interlayer adhesions, three layer films were made wherein one of the surface layers was comprised of an adhesive polymer as in TABLE 1. The adhesive polymer layers were 0.6 mil thick. The core layers were 0.3 mil thick and were comprised of 60% SOARNOL-E and 40% Emser F47 nylon 6. The other surface layer of the film was 1.35 mil thick and comprised 70% EVA and 30% LLDPE.

In the first film, the adhesive polymer used for the second and third layers was CXA 3101. The film was hazy and tacky, and the resulting film had a wrinkly, non-uniform appearance. Though this film was considered unacceptable because of its appearance, it was tested for interlayer adhesion at the adhesive polymer layer interface. That adhesion was 74 grams.

In the second film, the adhesive polymer was Plexar 100. This film was processed satisfactorily and had an acceptable appearance, and a favorable layer adhesion of 116 grams.

In a third film, the adhesive polymer was Plexar 3. This film was processed satisfactorily and had a good appearance, but the interlayer adhesion was only 34 grams, dramatically lower than the 760 grams attained in the comparable 5-layer film of EXAMPLE 4.

Regarding burst strengths of bags made from the films of the invention, it was expected that strengths would be related to the interlayer adhesions as shown in Table 2. For instance, the films of EXAMPLES 3 and 8 each have weak adhesion at one interface. It would be expected that these films would be too weak to function normally such as for forming sealed containers. From past experience with 3-layer films, it is expected that at least 100 grams, and preferrably 300 grams, of adhesion is desired.

Sealed bag containers were fabricated from films of EXAMPLES 1-10 by making heat seals about the periphery of respective overlapping terminal edges. It was unexpectedly found that all the films of the examples formed good heat seals in forming sealed film packages by well-known heat sealing techniques. The films of all the examples herein could not be broken at pressures of 29 psi. Packages made from film of EXAMPLE 12 were inflated to 45-55 psi before the seals failed.

As a comparison, a three layer oriented film having the structure EVA/EVOH/EVA was prepared and tested. The EVOH layer was 0.2 mil. The EVA layers were 0.6 and 1.45 mils thick, for an overall film thickness of 2.25 mils, the same thickness as in EXAMPLES 2-11. Thirty bags were tested in each of two bag sizes, 14"×28" and 22"×36". The range of burst strengths were 19-25 psi for the 14 inch bags and 18-24 lbs. for the 22 inch bags. Average burst strengths were 22.65 psi and 20.73 psi for the 14" and 22" bags respectively.

Regarding clip cut performance, bags made from the films of EXAMPLE 9 were tested on four clipping machines in a trial in a commercial plant. Clipping pressures and spikes were:

| Machine No. | Clip Pressure | Spike |
|---|---|---|
| 1 | 1350 | 60 |
| 2 | 1400 | 25 |
| 3 | 1425 | 50 |
| 4 | 1475 | 25 |

Out of 381 packages processed, only 4 packages were unacceptable because of clip cuts, for a highly satisfactory reject rate of 1%. Laboratory clipping trials on three-layer films of the structure /EVA/EVOH-/EVA/, wherein EVOH included several EVOH blends, showed a wide range of clip cut failures at 1700 psi clip pressure, 100 psi spike; on a 14-inch bag. Average clip cut failure for 24 varieties of 3-layer structure was 66%. On 22-inch bags, the average failure rate is expected to approach 100%.

One of the films in the above iterated clipping trials on 3-layer films had a core layer composition of 50% EVOH and 50% nylon. Its clip cut failure rate was 33%, whereas the failure rate for the five layer structure was 1%. Thus the addition of the second and third adhesive layers, while it did not always provide strong interlayer adhesion after the orientation process, it did provide uniformly strong heat seals, and excellent clip cut resistance.

In another plant trial, bags made from the films of EXAMPLE 10 were loaded with beef, sealed closed and heat shrunk. The bags had excellent seal properties. (The particular line on which the bags were tested had been experiencing a normal leaker rate of 8% to 15% using conventional bags having a three layer structure of /EVA/Saran/EVA/.) After being filled with meat, the bags were evacuated, heat sealed by a heat sealing bar, and heat shrunk at 200° F., all according to the normal operational practice on that line. In a test run of 1000 experimental bags made according to EXAMPLE 10, the leaker rate was only 4.5%.

The description herein has emphasized heat shrinkable films, and particularly those associated with meat packaging. The films of the invention may also be fabricated with use of a thermal operation known generally as "heat setting," wherein, after the film is oriented, it is held under moderate tension at an elevated temperature of about 210° Farenheit for about 2 to 10 seconds whereby the elastic memory of the film is relieved and the film loses its heat shrinking capability. Such films are dimensionally relatively stable at elevated temperatures. Such films may be preferred in packaging end use where heat shrinkage of the film is generally not preferred.

In making a bag, it is entirely satisfactory to start with a sheet of film and fold it over onto itself, with the fourth layer to the inside, and form heat seals along the terminal edges of the two opposite open sides to effect fabrication of a bag. After product has been inserted, the closing and sealing operation is the same as for a bag formed from tubular film.

While the films herein have been described as being preferential for use as a bag, they may be used as sheet film as well.

Also it is completely acceptable, and within the realm of the invention, to utilize the films described herein as a subassembly of a more complex film. Other layers may be adhesively mounted thereto. Particularly with regard to the heat set films, other layers may be added by thermal processes such as extrusion laminating, extrusion coating or combining at a nip with a combination of heat and pressure.

Other variations of the invention, in both the articles and the methods will now be obvious to those skilled in the art.

Having thus described the invention, what is claimed is:

1. A molecularly oriented film comprising five polymeric layers including:
    (a) a first oriented barrier layer having a composition of greater than 0% and no more than 50% nylon or nylon copolymer, and conversely less than 100% and at least 50% ethylene vinyl alcohol, said first layer having two opposing surfaces;
    (b) second and third oriented adhesive layers adhered to said surfaces of said first layer, said second and third adhesive layers both comprising olefinic polymers or copolymers having carboxyl modifications thereto; and
    (c) fourth and fifth oriented layers adhered to said second and third layers on the respective surfaces opposite said first layer, said fourth and fifth layers comprising 40% to 100% ethylene vinyl acetate and no more than 60% linear low density polyethylene, with greater than 0% linear low density polyethylene in at least one of said fourth and fifth layers;
    said layers being adhered to each other directly at the recited surface interfaces without the use of additional adhesive materials.

2. An oriented film comprising five polymeric layers as in claim 1 wherein said first layer is 30% to 50% nylon and 70% to 50% ethylene vinyl alcohol.

3. An oriented film comprising five polymeric layers as in claim 1 wherein said first layer is 40% nylon and 60% ethylene vinyl alcohol.

4. An oriented film comprising five polymeric layers as in claim 2 wherein said fourth and fifth layers comprise a blend of 10% to 60% linear low density polyethylene and 90% to 40% ethylene vinyl acetate.

5. An oriented film comprising five polymeric layers as in claim 2 wherein said fourth and fifth layers comprise a blend of 25% to 40% linear low density polyethylene and 75% to 60% ethylene vinyl acetate.

6. An oriented film comprising five polymeric layers as in claim 3 wherein said fourth and fifth layers comprise a blend of 10% to 60% linear low density polyethylene and 90% to 40% ethylene vinyl acetate.

7. An oriented film comprising five polymeric layers as in claim 3 wherein said fourth and fifth layers comprise a blend of 25% to 40% linear low density polyethylene and 75% to 60% ethylene vinyl acetate.

8. A fabricated plastic bag having an opening on one edge thereof, the remainder of the periphery of the bag having been closed by heat seals, said bag having been fabricated from an oriented film comprising five polymeric layers, including:
    (a) a first oriented barrier layer having a composition of greater than 0% and no more than 50% nylon or nylon copolymer, and conversely less than 100% and at least 50% ethylene vinyl alcohol, said first layer having two opposing surfaces;
    (b) second and third oriented adhesive layers adhered to said surfaces of said first layer, said second and third adhesive layers both comprising olefinic polymers or copolymers having carboxyl modifications thereto; and
    (c) fourth and fifth oriented layers adhered to said second and third layers on the respective surfaces opposite said first layer, said fourth and fifth layers comprising 40% to 100% ethylene vinyl acetate and no more than 60% linear low density polyethylene, with greater than 0% linear low density polyethylene in at least one of said fourth and fifth layers;
    said layers being adhered to each other directly at the recited surface interfaces without the use of additional adhesive materials;
    said bag being susceptible to being made into a closed and sealed container by means of a heat seal along said opening.

9. A plastic bag as in claim 8 wherein said first layer is 30% to 50% nylon and 70% to 50% ethylene vinyl alcohol.

10. A plastic bag as in claim 8 wherein said first layer is 40% nylon and 60% ethylene vinyl alcohol.

11. A plastic bag as in claim 9 wherein said fourth and fifth layers comprise a blend of 10% to 60% linear low density polyethylene and 90% to 40% ethylene vinyl acetate.

12. A plastic bag as in claim 9 wherein said fourth and fifth layers comprise a blend of 25% to 40% linear low density polyethylene and 75% to 60% ethylene vinyl acetate.

13. A plastic bag as in claim 8 wherein said fourth and fifth layers comprise a blend of 10% to 60% linear low density polyethylene and 90% to 40% ethylene vinyl acetate.

14. A plastic bag as in claim 8 wherein said fourth and fifth layers comprise a blend of 25% to 40% linear low density polyethylene and 75% to 60% ethylene vinyl acetate.

* * * * *